United States Patent
Zhang

(10) Patent No.: US 11,511,641 B2
(45) Date of Patent: Nov. 29, 2022

(54) AUTOMATIC CHARGING SYSTEM FOR INTELLIGENT DRIVING ELECTRIC VEHICLES AND CHARGING METHOD THEREOF

(71) Applicant: Ming Zhang, Guizhou (CN)

(72) Inventor: Ming Zhang, Guizhou (CN)

(73) Assignee: Guizhou Hankaisi Intelligent Technology Co., Ltd., Guizhou (CN)

( * ) Notice: Subject to any disclaimer, the term of this patent is extended or adjusted under 35 U.S.C. 154(b) by 289 days.

(21) Appl. No.: 16/836,963

(22) Filed: Apr. 1, 2020

(65) Prior Publication Data

US 2020/0317078 A1     Oct. 8, 2020

(30) Foreign Application Priority Data

Apr. 2, 2019  (CN) .......................... 201910262923.7

(51) Int. Cl.
   *B60L 53/66*       (2019.01)
   *B60L 58/12*       (2019.01)
   (Continued)

(52) U.S. Cl.
   CPC ............. *B60L 53/66* (2019.02); *B60L 58/12* (2019.02); *G05D 1/0088* (2013.01); *G08G 1/14* (2013.01);
   (Continued)

(58) Field of Classification Search
   CPC .... B60L 53/66; B60L 53/126; B60L 2260/32; B60L 58/12; B60L 2240/10;
   (Continued)

(56) References Cited

U.S. PATENT DOCUMENTS

2018/0272885 A1*  9/2018  Halker .................. B60L 53/665
2018/0304759 A1* 10/2018  Chase .................. G05B 19/042
(Continued)

FOREIGN PATENT DOCUMENTS

CN       106218427 A  * 12/2016
CN       107359652 A  * 11/2017
(Continued)

OTHER PUBLICATIONS

Loewel et al.; Identification and positioning system for inductive charging systems; 2013 3rd Intl. Electric Drives Production Conf. (EDPC); 2013; pp. 1-5 (Year: 2013).*
(Continued)

*Primary Examiner* — Michael J Zanelli

(57) ABSTRACT

An automatic charging system for intelligent driving electric vehicles and charging method thereof, comprising a vehicle-mounted terminal and a charging terminal; the vehicle-mounted terminal comprises a battery module, which is communicatively connected to a battery management system, and the battery module is electrically connected to a power receiving controller; the battery management system is connected to a vehicle control unit via a vehicle-mounted communication unit, the vehicle control unit is connected to an unmanned system, and the power receiving controller is electrically connected to a receiving coil; the charging terminal comprises a charging management system, which is respectively connected to the vehicle-mounted communication unit and a charging communication unit that is communicatively connected to a power transmitting controller, and the power transmitting controller is electrically connected to a transmitting coil. The invention realizes the flexibility and rapidization of charging, improves charging efficiency, and saves charging pile resource.

8 Claims, 2 Drawing Sheets

(51) Int. Cl.
 *G05D 1/00* (2006.01)
 *G08G 1/14* (2006.01)

(52) U.S. Cl.
 CPC ....... *B60L 2240/10* (2013.01); *B60L 2240/60* (2013.01); *G05D 2201/0213* (2013.01)

(58) Field of Classification Search
 CPC ..... B60L 2240/60; B60L 53/665; G08G 1/14; G08G 1/149; G08G 1/143; Y02T 90/167; Y02T 90/16; Y02T 10/7072; Y02T 10/70; Y02T 90/12; Y02T 90/14; Y04S 30/14; G05D 1/0088; G05D 2201/0213; G06Q 10/06315
 See application file for complete search history.

(56) References Cited

U.S. PATENT DOCUMENTS

2020/0198489 A1\* 6/2020 Yoon ................ B60L 53/36
2020/0307403 A1\* 10/2020 Rastoll ............... B60L 53/37

FOREIGN PATENT DOCUMENTS

| CN | 109177766 A | * | 1/2019 | |
| CN | 110217120 A | * | 9/2019 | ............. B60L 53/14 |
| JP | 2019075875 A | * | 5/2019 | |
| KR | 2012109023 A | * | 10/2012 | |
| WO | WO-2018195336 A1 | * | 10/2018 | ............ B60L 11/182 |

OTHER PUBLICATIONS

Smiai et al.; Information and communication technology research opportunities in dynamic charging for electric vehicle; 2015 Euromicro Conf. on Digital System Design; 2015; pp. 297-300 (Year: 2015).*
Timpner et al.; A Back-end System for an Autonomous Parking and Charging System for Electric Vehicles; 2012 IEEE Intl. Electric Vehicle Conf.; pp. 1-8 (Year: 2012).*
Vaidya et al.; Wireless Charging System for Connected and Autonomous Electric Vehicles; 2018 IEEE Globecom Workshops (GC Wkshps), pp. 1-6 (Year: 2018).*
Vishnu et al.; Smart Parking and Charging Management of Electric Vehicles in Public Parking Space; 2018 Second Intl. Conf. on Intelligent Computing and Control Systems (ICICCS); pp. 1401-1406 (Year: 2018).*

\* cited by examiner

AUTOMATIC CHARGING SYSTEM FOR INTELLIGENT DRIVING ELECTRIC VEHICLES AND CHARGING METHOD THEREOF

BACKGROUND OF THE INVENTION

1. Field of the Invention

The invention relates to the technical field of charging of intelligent driving electric vehicles, and in particular to an automatic charging system for intelligent driving electric vehicles and the charging method thereof.

2. Description of the Related Art

With the development of intelligence and electrification in today's transportation field, vehicles with special functions have appeared in people's field of vision, and the number of vehicles is constantly increasing. Among them, intelligent electric vehicles are increasingly favored by people; especially, the rapid development of intelligent driving vehicles brings new ways for people's living trip.

At present, however, regardless of the type of electric vehicle, the charging issue has always been a major concern for most people; moreover, the charging of electric vehicles at the present stage still relies on manual completion. This requires not only the charging gun user to have certain professional knowledge, but also needs to wait for the manual to pull the gun even after the charging is completed, which is inefficient, resulting in waste of charging pile resources and labor costs.

SUMMARY OF THE INVENTION

The object of the invention is to provide an automatic charging system for intelligent driving electric vehicles and the charging method thereof. The invention realizes the flexibility and rapidization of charging of electric vehicles, improves the charging efficiency, and saves the charging pile resource.

The technical solutions of the invention: an automatic charging system for intelligent driving electric vehicles, comprising a vehicle-mounted terminal and a charging terminal; the vehicle-mounted terminal comprises a battery module; the battery module is communicatively connected to a battery management system, and the battery module is electrically connected to a power receiving controller; the battery management system is communicatively connected to a vehicle control unit via a vehicle-mounted communication unit, the vehicle control unit is communicatively connected to an unmanned system, and the power receiving controller is electrically connected to a receiving coil;

the charging terminal comprises a charging management system; the charging management system is respectively communicatively connected to the vehicle-mounted communication unit and a charging communication unit, the charging communication unit is communicatively connected to a power transmitting controller, and the power transmitting controller is electrically connected to a transmitting coil.

In the automatic charging system for intelligent driving electric vehicles, the charging management system comprises a vehicle identification module, a parking space charging and positioning module, a remaining parking space inquiry module, a charging billing module, and a charging management module;

the vehicle identification module is configured to identify the license plate information of the electric vehicle;

the parking space charging and positioning module is configured to detect the remaining parking space of the charging terminal;

the remaining parking space inquiry module is configured to record and inquire the vacant parking space information;

the charging billing module is configured for charging and billing;

the charging management module is configured for communication interaction, charging self-checking, charging logic control, and charging security monitoring.

The charging method of the automatic charging system for intelligent driving electric vehicles is carried out by the following steps:

a. the charging signal is sent from the battery management system to the vehicle control unit;

b. the sent charging signal is sent to the unmanned system by the vehicle control unit;

c. the unmanned system performs path planning after receiving the charging signal, and controls the electric vehicle to go to the charging station of the nearest charging terminal according to the planned path;

d. after the vehicle enters the charging station, a wireless communication connection is established between the electric vehicle of the vehicle-mounted terminal and the charging station of the charging terminal, and a charging handshake confirmation is performed; after confirmation, the vehicle control unit controls the electric vehicle to turn off and enters the mode to be charged;

e. after the mode to be charged is entered, the battery management system performs self-test; after the self-test is completed, the battery management system requests the charging management system for charging voltage and current, the power receiving controller and the power transmitting controller are activated, and the receiving coil and the transmitting coil are mutually inductively charged.

In step e of the charging method of the automatic charging system for intelligent driving electric vehicles, the self-test of the battery management system includes insulation detection and high-voltage loop interlock detection.

In step e of the charging method of the automatic charging system for intelligent driving electric vehicles, after the mutual inductance charging is completed or the vehicle control unit receives the charging stop signal from the unmanned system, the vehicle control unit controls the battery management system to be adjusted from the charging mode to the power-off mode; after that, the charging management system stops the current and voltage output, and the power transmitting controller and the power receiving controller respectively control the transmitting coil and the receiving coil to stop charging.

In step e of the charging method of the automatic charging system for intelligent driving electric vehicles, after the charging is stopped, the charging management system performs cost accounting and deduction; after the cost deduction is completed, the unmanned system controls the electric vehicle to exit the charging station.

In step c of the charging method of the automatic charging system for intelligent driving electric vehicles, when the unmanned system performs path planning, it first sends a charging request to the charging management system of the nearest charging terminal; the charging management system receives the charging request, controls the remaining parking space inquiry module to inquire the remaining parking space information, and feeds the remaining parking space information back to the unmanned system, then the unmanned system performs path planning according to the vacant parking space information.

In step b of the charging method of the automatic charging system for intelligent driving electric vehicles, the vehicle control unit sends a charging signal while predicting the maximum driving distance of the remaining battery capacity of the battery module; in step c, after the unmanned system completes the path planning, the path planning is sent back to the vehicle control unit; the vehicle control unit compares the maximum driving distance and the planned path:

when the stroke of the maximum driving distance is greater than or equal to the stroke of the planned path, the vehicle control unit takes over the power of the electric vehicle to the unmanned system, and the electric vehicle goes to the charging station according to the planned path;

when the stroke of the maximum driving distance is less than the stroke of the planned path, the electric vehicle enters the low power mode, it no longer goes to the charging station for charging, and uploads the vehicle status and location information through the unmanned system, waiting for artificial processing.

In step e of the charging method of the automatic charging system for intelligent driving electric vehicles, before the receiving coil and the transmitting coil are mutually inductively charged, a small current pre-charging is performed first.

Advantageous Effects

Compared with the prior art, the invention combines the intelligent driving technology with the automatic charging technology, and the whole process of charging is an unmanned operation, realizing the automatic charging of electric vehicles, thereby replacing the manual charging, which not only improves the charging efficiency, but also realizes the flexibility and rapidization of charging, and reduces the labor cost. When the electric vehicle is being charged, the invention performs path planning through the unmanned system, and calculates the maximum driving distance of the remaining electric power through the vehicle control unit; after free charging parking space within the maximum driving distance is confirmed, the electric vehicle is controlled by the unmanned system to go for charging; by this method, the invalid driving distance is avoided, and the energy efficient utilization rate is improved. At the same time, the invention transmits the vacant parking space information of the charging station to the unmanned system through the charging management system, and the unmanned system performs optimal path planning according to the received vacant parking space information, which avoids the situation that the electric vehicle blindly concentrates on a certain charging station and the other charging stations are vacant without knowing the vacant parking space information, thereby avoiding the phenomenon that the charging waiting time is long and the charging pile resource configuration is unreasonable, resulting in waste of resources.

To summarize, the invention realizes the flexibility and rapidization of charging of electric vehicles, improves the charging efficiency, and saves the charging pile resource.

Figure 1:
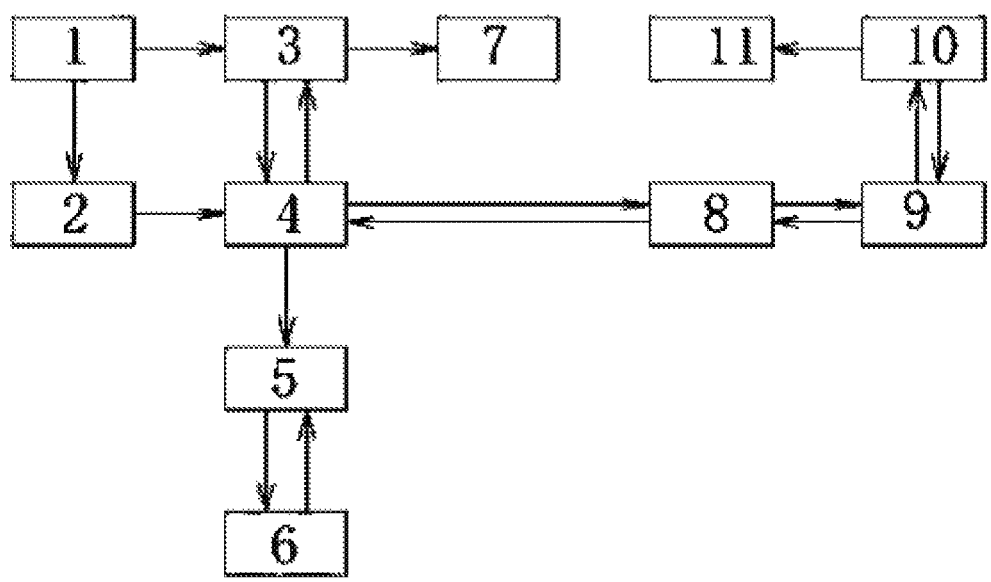
FIG. 1 is a schematic view illustrating the system structure of the invention.

Reference numerals: 1 refers to the battery module; 2 refers to the battery management system; 3 refers to the power receiving controller; 4 refers to the vehicle-mounted communication unit; 5 refers to the vehicle control unit; 6 refers to the unmanned system; 7 refers to the receiving coil; 8 refers to the charging management system; 9 refers to the charging communication unit; 10 refers to the power transmitting controller; 11 refers to the transmitting coil.

DERAILED DESCRIPTION OF THE PREFERRED EMBODIMENTS

The invention is further described hereinafter with reference to the drawings and embodiments, but the invention is not limited thereto.

Embodiment 1. An automatic charging system for intelligent driving electric vehicles, as shown in FIG. 1, comprising a vehicle-mounted terminal and a charging terminal; the vehicle-mounted terminal comprises a battery module 1; the battery module 1 is communicatively connected to a battery management system 2, and the battery module 1 is electrically connected to a power receiving controller 3; the battery management system 2 is communicatively connected to a vehicle control unit 5 via a vehicle-mounted communication unit 4, the vehicle control unit 5 is communicatively connected to an unmanned system 6, and the power receiving controller 3 is electrically connected to a receiving coil 7;

the charging terminal comprises a charging management system 8; the charging management system 8 is respectively communicatively connected to the vehicle-mounted communication unit 4 and a charging communication unit 9, the charging communication unit 9 is communicatively connected to a power transmitting controller 10, and the transmitting controller 10 is electrically connected to a transmitting coil 11.

With the structure, the electromagnetic resonance charging by the vehicle terminal and the charging terminal is realized (i.e., the receiving coil 7 and the transmitting coil 11 are mutually inductively charged); the physical connection between the electric vehicle and the charging pile is no longer required, and the charging is performed by the non-physical contact power transmission mode; by converting electrical energy into an electromagnetic resonance state, electrical energy is transmitted in a wireless form, instead of the existing one being operated by a human-operated charging gun (charging cable).

The battery management system 2 is mainly responsible for charging and discharging management of the vehicle-mounted battery module 1, and real-time monitoring of the state of use of the battery; the control system ensuring the battery safety by a preset threshold is responsive to the charging and discharging requirements of the electric vehicle.

The power receiving controller 3 is mainly a vehicle-mounted power control unit, and rectifies the high-frequency alternating current output from the secondary side, and outputs the direct current that meets the requirements of the battery module 1 of the electric vehicle.

The vehicle-mounted communication unit 4 mainly performs communication tasks with the battery management system 2, the vehicle control unit 5, the power receiving controller 3, and the charging management system 8 of the charging terminal, and receives, processes, and transmits signals.

The vehicle control unit 5 mainly functions as an information integration and decision-making of the electric vehicle, has the prior decision-making power, and is a hub for directing other execution structures on the electric vehicle.

The unmanned system 6 can be adopted as the unmanned system of Autoware, Apollo of Baidu, or Google.

The receiving coil 7 and the transmitting coil 11 are each composed of a large inductance coil connected in parallel or in series with a small capacitor as an electromagnetic resonance device. The transmitting coil 11 receives the alternating current from the power transmitting controller 10, generates electromagnetic waves of a specific frequency, and is diffused to the receiving coil 7 through the electromagnetic field to generate a magnetic field resonance of the same frequency, and the energy can be transferred by the LC resonators of two identical resonant frequencies.

The charging communication unit 9 mainly communicates with the charging management system 8 and the power transmitting controller 10, and serves to receive, process, and transmit information.

The power transmitting controller 10 mainly implements frequency conversion of 220V voltage (or other) of the charging terminal to high frequency alternating current, and outputs alternating current that satisfies the working frequency of the vehicle-mounted terminal charging, to drive the transmitting coil 11 to work, so the wireless terminal charging process control of the electric vehicle is completed according to the control signal. The charging management system 8 comprises a vehicle identification module, a parking space charging and positioning module, a remaining parking space inquiry module, a charging billing module, and a charging management module;

the vehicle identification module is configured to identify the license plate information of the electric vehicle; the license plate is a unique identity of the vehicle. When the vehicle enters the door of the charging station, the vehicle identification module of the charging station identifies the vehicle information; if the vehicle is in an abnormal state (arrears, loss, etc.), the vehicle information will be recorded to the charging management system 8 while the vehicle is refused to enter; if the vehicle is in a normal state, the remaining parking space inquiry module is started at the same time, and the vacant parking space is inquired for the vehicle to enter normally; similarly, when the charging is completed and the vehicle exits, it is confirmed that the fee has been cleared and can be normally exited; if the vehicle is in an unpaid state, the fee must be re-paid;

the parking space charging and positioning module is configured to detect the remaining parking space of the charging terminal; if no vehicle is charging on the parking space, the positioning module transmits the parking space information to the remaining parking space inquiry module, which is marked as a vacant parking space (remaining parking space). The vacant parking space position will be sent to the unmanned system 6 of the vehicle terminal, and the electric vehicle can arrive at the vacant parking space position according to the planned path, and then the parking space charging and positioning module synchronizes the used parking position information to the remaining parking space inquiry module;

the remaining parking space inquiry module is configured to record and inquire the vacant parking space information; it mainly communicates with the vehicle identification module and the parking space charging and positioning module in real time, and can record the remaining parking space information in the charging station in the charging management system 8 in real time, and also record the occupied parking space information in real time;

the charging billing module is configured for charging and billing; the main purpose thereof is to calculate the charging cost of the electric vehicle that is uniquely identified by the license plate number, and the owner of each vehicle charges in the system with the license plate number as the identification; after each charging is completed, the charging billing module calculates the spending cost according to the charging electricity quantity, and automatically generates a table of the start time of charging, the parking space number, the license plate number, the charging cost, the total amount of charging, and the like, which are stored in the charging management system 8 and can be invoked by the owner. At the same time, when the cost is deducted successfully, the vehicle information with successful cost deduction is sent to the vehicle identification module, then the charging is completed, and the vehicle can exit the charging station;

the charging management module is configured for communication interaction, charging self-checking, charging logic control, and charging security monitoring; if the electric vehicle has accurately reached the specified charging position, the charging management module will respond to the charging demand of the electric vehicle; however, for safety reasons, a pre-charge mode needs to be performed first, and there is only a small current to judge whether the entire charging system is faulty. The faults are mainly divided into three categories: 1. vehicle fault; at this time, when the vehicle itself is detected to be faulty, the charging is disconnected and the vehicle returns. 2. If a charger fault is detected, the fault code is uploaded to the charging system, the charging is disconnected, and the parking space is re-planned to the vehicle. 3. If it is because the receiving coil 7 of the vehicle terminal and the transmitting coil 11 of the charging terminal are not in the proper relative position and cannot be inductively charged, it is necessary to start the vehicle and re-enter the parking space to try again.

Figure 2:
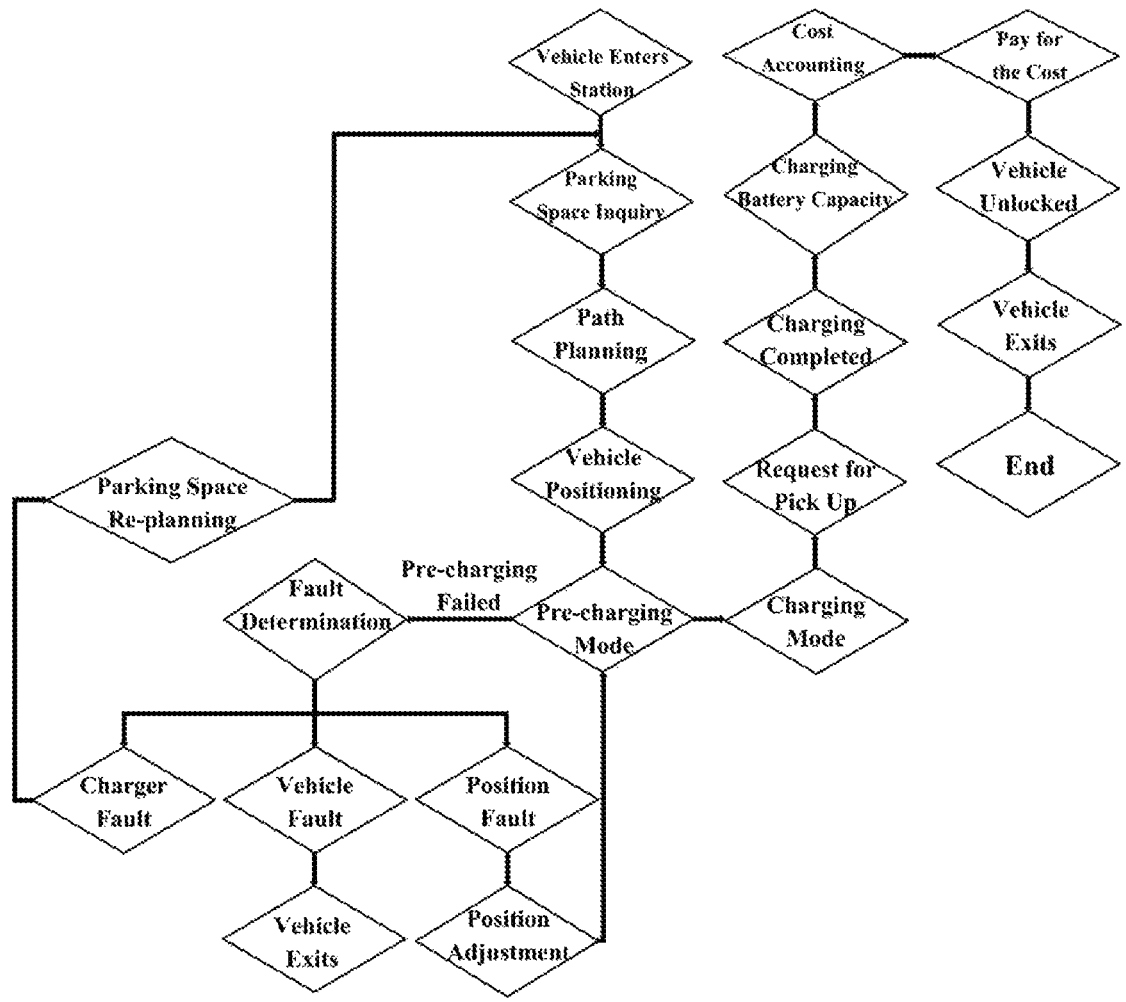
FIG. 2 is a flow chart illustrating the charging method of the invention.

The charging method of the automatic charging system for intelligent driving electric vehicles, as shown in FIG. 2, is carried out by the following steps:

a. the charging signal is sent from the battery management system 2 to the vehicle control unit 5; when the battery capacity of the battery module 1 of the electric vehicle is lower than 15% (different vehicles may be different on it, the driving distance is required to be at least 30 kilometers to avoid the exhaustion of the battery), the battery management system 2 will send a charging signal to the vehicle control unit 5;

b. the sent charging signal is sent to the unmanned system 6 by the vehicle control unit 5;

c. the unmanned system 6 performs path planning after receiving the charging signal, and controls the electric vehicle to go to the charging station of the nearest charging terminal according to the planned path;

d. after the vehicle enters the charging station, a wireless communication connection is established between the electric vehicle of the vehicle-mounted terminal and the charging station of the charging terminal, and a charging handshake confirmation is performed; after confirmation, the vehicle control unit 5 controls the electric vehicle to turn off and enters the mode to be charged; in the mode to be charged, the brake system or the EPB (Electrical Park Brake) starts to lock.

e. after the mode to be charged is entered, the battery management system 2 performs self-test; after the self-test is completed, the battery management system 2 requests the charging management system 8 for charging voltage and current, the power receiving controller 3 and the power transmitting controller 10 are activated, and the receiving coil 7 and the transmitting coil 11 are mutually inductively charged. In order to facilitate the mutual inductance between the receiving coil 7 and the transmitting coil 11, the receiving coil 7 is mounted under the engine compartment of the vehicle, and the transmitting coil 11 is mounted on the parking floor and is ensured to be aligned with the receiving coil 7 in the vertical direction for mutual inductance.

In step e, the self-test of the battery management system 2 includes insulation detection and high-voltage loop interlock detection, with emphasis on insulation detection.

In step e, after the mutual inductance charging is completed (i.e., the battery capacity reaches 100%) or the vehicle control unit 5 receives the charging stop signal from the unmanned system 6, the vehicle control unit 5 controls the battery management system 2 to be adjusted from the charging mode to the power-off mode; after that, the charging management system 8 stops the current and voltage output, and the power transmitting controller 10 and the power receiving controller 3 respectively control the transmitting coil 11 and the receiving coil 7 to stop charging.

In step e, after the charging is stopped, the charging management system 8 performs cost accounting and deduction; after the cost deduction is completed, the unmanned system 6 controls the electric vehicle to exit the charging station.

In step c, when the unmanned system 6 performs path planning, it first sends a charging request to the charging management system 8 of the nearest charging terminal; the charging management system 8 receives the charging request, controls the remaining parking space inquiry module to inquire the remaining parking space information, and feeds the remaining parking space information back to the unmanned system 6, then the unmanned system 6 performs path planning according to the vacant parking space information.

in step b, the vehicle control unit 5 sends a charging signal while predicting the maximum driving distance of the remaining battery capacity of the battery module 1, when in predicting, the distance is automatically deducted by 10% to be reserved for the breakdown in the emergency situation; in step c, after the unmanned system 6 completes the path planning, the path planning is sent back to the vehicle control unit 5; the vehicle control unit 5 compares the maximum driving distance and the planned path:

when the stroke of the maximum driving distance is greater than or equal to the stroke of the planned path, the vehicle control unit 5 takes over the power of the electric vehicle to the unmanned system 6, and the electric vehicle goes to the charging station according to the planned path;

when the stroke of the maximum driving distance is less than the stroke of the planned path, the electric vehicle enters the low power mode, it no longer goes to the charging station for charging, and uploads the vehicle status and location information through the unmanned system 6, waiting for artificial processing.

In step e, before the receiving coil 7 and the transmitting coil 11 are mutually inductively charged, a small current pre-charging is performed first.

What is claimed is:

1. An automatic charging system for intelligent driving electric vehicles, comprising a vehicle-mounted terminal and a charging terminal; the vehicle-mounted terminal comprises a battery module (1); the battery module (1) is communicatively connected to a battery management system (2), and the battery module (1) is electrically connected to a power receiving controller (3); the battery management system (2) is communicatively connected to a vehicle control unit (5) via a vehicle-mounted communication unit (4), the power receiving controller (3) is communicatively connected to the vehicle-mounted communication unit (4), the vehicle control unit (5) is communicatively connected to an unmanned system (6), and the power receiving controller (3) is electrically connected to a receiving coil (7);

the charging terminal comprises a charging management system (8); the charging management system (8) is respectively communicatively connected to the vehicle-mounted communication unit (4) and a charging communication unit (9), the charging communication unit (9) is communicatively connected to a power transmitting controller (10), and the power transmitting controller (10) is electrically connected to a transmitting coil (11);

wherein the charging management system (8) comprises a vehicle identification module, a parking space charging and positioning module, a remaining parking space inquiry module, a charging billing module, and a charging management module;

the vehicle identification module is configured to identify license plate information of the electric vehicle;

the parking space charging and positioning module is configured to detect a remaining parking space of the charging terminal;

the remaining parking space inquiry module is configured to record and inquire a vacant parking space information;

the charging billing module is configured for charging and billing;

the charging management module is configured for communication interaction, charging self-checking, charging logic control, and charging security monitoring.

2. A charging method of the automatic charging system for intelligent driving electric vehicles according to claim 1, wherein it is carried out by the following steps:

a. a charging signal is sent from the battery management system (2) to the vehicle control unit (5);

b. the sent charging signal is sent to the unmanned system (6) by the vehicle control unit (5);

c. the unmanned system (6) performs path planning after receiving the charging signal, and controls the electric vehicle to go to the charging station of the nearest charging terminal according to the planned path;

d. after the vehicle enters the charging station, a wireless communication connection is established between the electric vehicle of the vehicle-mounted terminal and the charging station of the charging terminal, and a charging handshake confirmation is performed; after confirmation, the vehicle control unit (5) controls the electric vehicle to turn off and enters the mode to be charged;

e. after the mode to be charged is entered, the battery management system (2) performs self-test; after the self-test is completed, the battery management system (2) requests the charging management system (8) for charging voltage and current, the power receiving controller (3) and the power transmitting controller (10) are activated, and the receiving coil (7) and the transmitting coil (11) are mutually inductively charged.

3. The charging method of the automatic charging system for intelligent driving electric vehicles according to claim 2, wherein in step e, the self-test of the battery management system (2) includes insulation detection and high-voltage loop interlock detection.

4. The charging method of the automatic charging system for intelligent driving electric vehicles according to claim 2, wherein in step e, after the mutual inductance charging is completed or the vehicle control unit (5) receives a charging stop signal from the unmanned system (6), the vehicle control unit (5) controls the battery management system (2) to be adjusted from the charging mode to a power-off mode; after that, the charging management system (8) stops the current and voltage output, and the power transmitting controller (10) and the power receiving controller (3) respectively control the transmitting coil (11) and the receiving coil (7) to stop charging.

5. The charging method of the automatic charging system for intelligent driving electric vehicles according to claim 4, wherein in step e, after the charging is stopped, the charging management system (8) performs cost accounting and deduction; after the cost deduction is completed, the unmanned system (6) controls the electric vehicle to exit the charging station.

6. The charging method of the automatic charging system for intelligent driving electric vehicles according to claim 2, wherein in step c, when the unmanned system (6) performs path planning, it first sends a charging request to the charging management system (8) of the nearest charging terminal; the charging management system (8) receives the charging request, controls a remaining parking space inquiry module to inquire a remaining parking space information, and feeds the remaining parking space information back to the unmanned system (6), then the unmanned system (6) performs path planning according to a vacant parking space information.

7. The charging method of the automatic charging system for intelligent driving electric vehicles according to claim 2, wherein in step b, the vehicle control unit (5) sends a charging signal while predicting a maximum driving distance of a remaining battery capacity of the battery module (1); in step c, after the unmanned system (6) completes the path planning, the path planning is sent back to the vehicle control unit (5); the vehicle control unit (5) compares the maximum driving distance and the planned path:
  when the maximum driving distance is greater than or equal to the planned path, the vehicle control unit (5) takes over the power of the electric vehicle to the unmanned system (6), and the electric vehicle goes to the charging station according to the planned path;
  when the maximum driving distance is less than the planned path, the electric vehicle enters a low power mode, it no longer goes to the charging station for charging, and uploads a vehicle status and location information through the unmanned system (6), waiting for artificial processing.

8. The charging method of the automatic charging system for intelligent driving electric vehicles according to claim 2, wherein in step e, before the receiving coil (7) and the transmitting coil (11) are mutually inductively charged, a small current pre-charging is performed first.

\* \* \* \* \*